United States Patent
Katayama et al.

(10) Patent No.: US 6,938,594 B2
(45) Date of Patent: *Sep. 6, 2005

(54) VALVE TIMING CONTROL FOR MARINE ENGINE

(75) Inventors: Goichi Katayama, Shizuoka (JP); Yoshibumi Iwata, Shizuoka (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/178,336

(22) Filed: Jun. 21, 2002

(65) Prior Publication Data

US 2003/0000490 A1 Jan. 2, 2003

(30) Foreign Application Priority Data

Jun. 21, 2001 (JP) .......................................... 2001-188649

(51) Int. Cl.$^7$ .................................................. F01L 1/34
(52) U.S. Cl. ................................ 123/90.17; 123/90.15; 123/90.12
(58) Field of Search ......................... 123/90.15–90.17, 123/90.12, 90.31; 74/568 R; 464/1, 2, 160; 92/121, 122

(56) References Cited

U.S. PATENT DOCUMENTS

| | | |
|---|---|---|
| 5,012,773 A | 5/1991 | Akasaka et al. |
| 5,058,539 A | 10/1991 | Saito et al. |
| 5,111,780 A | 5/1992 | Hannibal |
| 5,133,310 A | 7/1992 | Hitomi et al. |
| 5,143,034 A | 9/1992 | Hirose |

(Continued)

FOREIGN PATENT DOCUMENTS

| | | |
|---|---|---|
| EP | 0 356 162 A1 | 2/1990 |
| EP | 0 699 831 A2 | 3/1996 |
| EP | 0 808 997 A1 | 11/1997 |
| EP | 0 829 621 A2 | 3/1998 |

OTHER PUBLICATIONS

Co-pending U.S. Appl. No. 10/078,275, entitled Control System for Marine Engine, filed on Feb. 14, 2002 in the name of Isao Kanno and assigned to Sanshin Kogyo Kabushiki Kaisha.
Application entitled, Four-Cycle Engine for Marine Drive, Publication No. 2002/0017277 with publication date of Feb. 14, 2002.
Application entitled, Control System for Marine Engine, U.S. Appl. No. 10/078,275, filed on Feb. 14, 2002 in 35 pgs. along with 13 sheets of informal drawings.

*Primary Examiner*—Thomas Denion
*Assistant Examiner*—Jaime Corrigan
(74) *Attorney, Agent, or Firm*—Knobbe, Martens, Olson & Bear LLP

(57) ABSTRACT

An engine for a marine drive has a combustion chamber. An engine body of the engine defines an air intake port communicating with the combustion chamber. An air induction device communicates with the air intake port to introduce air to the combustion chamber through the air intake port. The air induction device includes a throttle valve to regulate an amount of the air. An air intake valve moves between an opening position and a closing position of the intake port. A camshaft actuates the intake valve. A VVT mechanism changes an actuating timing of the camshaft at which the camshaft actuates the intake valve. A control device controls the change mechanism. A throttle position sensor, an intake pressure or other sensors sends respective signals to the control device. The control device determines a sudden acceleration state of the engine based upon at least one of the signals. The control device triggers the VVT mechanism to advance the actuating timing based only upon the throttle opening degree signal when the control device determines the sudden acceleration state.

34 Claims, 9 Drawing Sheets

U.S. PATENT DOCUMENTS

| | | | |
|---|---|---|---|
| 5,150,675 A | | 9/1992 | Murata |
| 5,184,581 A | | 2/1993 | Aoyama et al. |
| 5,189,999 A | | 3/1993 | Thoma |
| 5,301,639 A | | 4/1994 | Satou |
| 5,305,718 A | | 4/1994 | Muller |
| 5,353,755 A | | 10/1994 | Matsuo et al. |
| 5,458,099 A | | 10/1995 | Koller et al. |
| 5,474,038 A | | 12/1995 | Golovatai-Schmidt et al. |
| 5,540,197 A | | 7/1996 | Golovatai-Schmidt et al. |
| 5,606,941 A | | 3/1997 | Trzmiel et al. |
| 5,606,952 A | | 3/1997 | Kanno et al. |
| 5,628,286 A | * | 5/1997 | Kato et al. ............... 123/90.15 |
| 5,669,343 A | | 9/1997 | Adachi |
| 5,713,319 A | | 2/1998 | Tortul |
| 5,718,196 A | | 2/1998 | Uchiyama et al. |
| 5,758,612 A | | 6/1998 | Tsuzuku et al. |
| 5,797,363 A | | 8/1998 | Nakamura |
| 5,799,631 A | | 9/1998 | Nakamura |
| 5,813,377 A | | 9/1998 | Matsunaga |
| 5,826,560 A | | 10/1998 | Ito |
| 5,829,399 A | | 11/1998 | Scheidt et al. |
| 5,836,274 A | | 11/1998 | Saito et al. |
| 5,855,190 A | | 1/1999 | Matsunaga |
| 5,913,298 A | | 6/1999 | Yoshikawa |
| 5,924,395 A | * | 7/1999 | Moriya et al. ............ 123/90.15 |
| 5,954,019 A | | 9/1999 | Yoshikawa et al. |
| 5,967,125 A | * | 10/1999 | Morikawa ................... 123/520 |
| 5,970,929 A | * | 10/1999 | Tacquet ................... 123/90.15 |
| 6,015,319 A | | 1/2000 | Tanaka |
| 6,032,629 A | | 3/2000 | Uchida |
| 6,035,817 A | | 3/2000 | Uchida |
| 6,076,492 A | | 6/2000 | Takahashi |
| 6,116,228 A | | 9/2000 | Motose et al. |
| 6,170,446 B1 | * | 1/2001 | Hashimoto ............... 123/90.15 |
| 6,182,636 B1 | * | 2/2001 | Russell et al. .............. 123/399 |
| 6,186,105 B1 | | 2/2001 | Yonezawa |
| 6,189,498 B1 | | 2/2001 | Yonezawa et al. |
| 6,250,266 B1 | | 6/2001 | Okui et al. |
| 6,289,861 B1 | | 9/2001 | Suzuki |
| 6,325,031 B1 | | 12/2001 | Takano |
| 6,343,580 B2 | | 2/2002 | Uchida |
| 6,343,581 B2 | | 2/2002 | Suzuki |
| 6,354,277 B1 | | 3/2002 | Kato |
| 6,357,405 B1 | | 3/2002 | Tsuji et al. |
| 2002/0017277 A1 | | 2/2002 | Kanno |

* cited by examiner

VALVE TIMING CONTROL FOR MARINE ENGINE

PRIORITY INFORMATION

This application is based on and claims priority to Japanese Patent Applications No. 2001-188649, filed Jun. 21, 2001, the entire contents of which is hereby expressly incorporated by reference.

BACKGROUND OF THE INVENTION

1. Field of the Invention

The present invention generally relates to a valve timing control for a marine drive, and more particularly to an improved valve timing control for a marine drive that includes a variable valve timing mechanism.

2. Description of the Related Art

A marine drive such as an outboard motor has a marine propulsion device powered by an engine. The propulsion device typically is a propeller and is submerged when an associated watercraft rests on a body of water. The outboard motor can employ either a two-cycle engine or a four-cycle engine. Recently, however, many outboard motors are offered with four-cycle engines because they provide better emissions control.

Typically, a four-cycle engine includes one or more intake and exhaust valve moving between an open position and a closed position. One or more camshafts can be provided to actuate the valves in a timed manner. When the intake valves are open, air is introduced into combustion chambers of the engine through the intake ports. When the exhaust valves open, exhaust gases are discharged from the combustion chambers through the exhaust ports.

The engine typically includes one or more throttle valves to regulate an amount of air delivered to the combustion chambers. The throttle valves can be operated by the operator with a throttle lever. In general, the more the throttle valves open, the more power is output from the engine.

The engine can include a hydraulically operated variable valve timing (VVT) mechanism that can change the ing and closing timings of the respective valves by changing an angular position of the camshaft or camshafts. A control device such as, for example, an electronic control unit (ECU) is used to control the VVT mechanism under various control strategies. For instance, the ECU controls the VVT mechanism either to set the valve timing at a fully advanced position for relatively high engine speeds to ensure high charging efficiency and high performance of the engine, or to set the valve timing at a fully retarded position for relatively low engine speeds to ensure high combustion efficiency, fuel economy and good emission control. Otherwise, the ECU controls the VVT mechanism to set the valve timing at a position between the fully advanced position and the fully retarded position in response to a running condition of the engine.

The ECU can control the VVT mechanism to provide any position between the fully advanced position and the fully retarded position in response to, for example, a throttle valve position and an engine speed. Because throttle valves typically are cable-actuated the throttle position changes almost simultaneously with throttle lever movements. However, the engine speed changes after a certain delay following a charge in the throttle degree position.

SUMMARY OF THE INVENTION

One aspect of the present invention is the realization that in marine drives, such as, for example, but without limitation, outboard motors, the engine speed can increase more quickly than the VVT system can respond. For example, slippage of the propeller in the body of water or relatively rapid control of the throttle lever by the operator can cause the engine speed to increase significantly more quickly than the VVT system can adjust itself. Additionally, outboard motors offer only a limited space for the VVT mechanism, specifically, for hydraulic circuits thereof. As a result, the valve timing control in marine drives can be unacceptably delayed.

In accordance with another aspect of the present invention, an internal combustion engine for a marine drive comprises an engine body. A movable member is movable relative to the engine body. The engine body and the movable member together define a combustion chamber. The engine body defines an air intake port communicating with the combustion chamber. An air induction device communicates with the air intake port to introduce air to the combustion chamber through the air intake port. The air induction device includes a throttle valve arranged to regulate an amount of the air. An air intake valve at the intake port is arranged to move between an open and closed position. A valve actuator is arranged to actuate the intake valve. A change mechanism is arranged to change a timing of the valve actuator at which the valve actuator actuates the intake valve. A control device is configured to control the change mechanism. At least one sensor is configured to detect at least one of a throttle opening the throttle valve, an intake pressure in the air induction device, and an amount of the air in the air induction device. The control is configured to a sudden acceleration state of the engine based at least to the throttle opening, the intake pressure, the air amount, and another operational condition of the engine and detected by another sensor. The control device controls the change mechanism to advance the actuating timing based only upon the throttle opening degree signal, the intake pressure signal, or the air amount signal when the control device determines the sudden acceleration state.

In accordance with an additional aspect of the present invention, an internal combustion engine for a marine drive includes an engine body, and a movable member movable relative to the engine body. The engine body and the movable member together define a combustion chamber. The engine body also defines an air intake port communicating with the combustion chamber. An air induction device communicates with the air intake port to introduce air to the combustion chamber through the air intake port and an air intake valve is arranged to move between an open position and a closed position of the intake port. A valve actuator is configured to actuate the intake valve. A change mechanism is configured to change a timing of the valve actuator at which the valve actuator actuates the intake valve. A control device is configured to control the change mechanism. At least one sensor is configured to sense an operational condition of the engine and to send a signal to the control device, the control device determining a sudden acceleration state of the engine based upon the signal. The control device is configured to control the change mechanism to advance the timing to a preset timing when the control device determines the sudden acceleration state.

In accordance with a further aspect of the present invention, a method for controlling an internal combustion engine which includes an intake valve, a valve actuator configured to actuate the intake valve, and a change mechanism configured to change a timing of the valve actuator at which the valve actuator actuates the intake valve, comprises determining a sudden acceleration state of the engine based upon an operational condition of the engine. The method also includes sensing one of a throttle opening, an intake pressure and an air amount, and controlling the change mechanism to advance the actuating timing based only upon at least one of the sensed throttle opening degree, the air intake pressure or the air amount when the sudden acceleration state is determined.

In accordance with a still further aspect of the present invention, a method for controlling an internal combustion engine is provided. The engine includes an intake valve, a valve actuator configured to actuate the intake valve, and a change mechanism configured to change a timing of the valve actuator at which the valve actuator actuates the intake valve. The method includes determining a sudden acceleration state of the engine based upon an operational condition of the engine, and controlling the change mechanism to advance the actuating timing to a preset timing when the sudden acceleration is determined.

In accordance with a still further aspect of the present invention, an internal combustion engine includes an engine body defining a combustion chamber and an air intake port communicating with the combustion chamber. An air induction device is configured to guide air to the air intake port. An air intake valve is configured to move between a first position in which the air intake port is open and a second position in which the intake port is closed. A valve actuator is configured to move the intake valve between the first and second positions. A valve actuator adjustment mechanism is configured to adjust a timing at which the valve actuator moves the valve between the first and second positions, wherein the adjustment mechanism is configured to operate in at least a first mode in which the adjustment mechanism changes the timing of the valve actuator without regard to a speed of the engine.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise nine figures.

DETAILED DESCRIPTION OF THE PREFERRED EMBODIMENTS OF THE INVENTION

Figure 1:
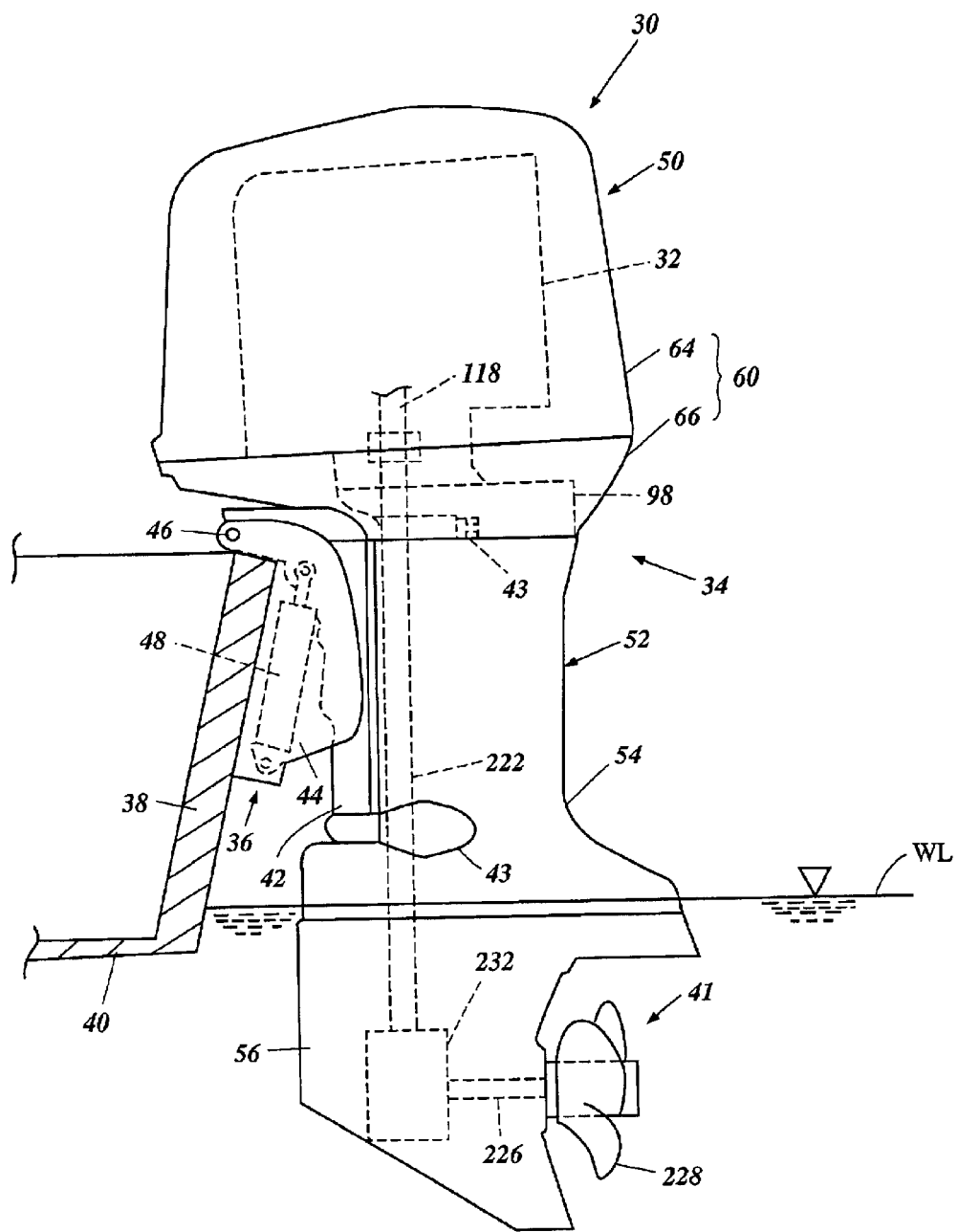
FIG. 1 is a side elevational view of an outboard motor configured in accordance with a preferred embodiment of the present invention. An engine and drive train are illustrated in phantom.

With reference to FIGS. 1–5, an overall construction of an outboard motor 30 that employs an internal combustion engine 32 configured in accordance with certain features, aspects and advantages of the present invention is described below. The engine 32 has particular utility in the context of a marine drive, such as the board motor, and thus is described in the context of an outboard motor. The engine 32, however, can be used with other types of marine drives (i.e., inboard motors, inboard/outboard motors, jet drives, etc.) and also certain land vehicles. In any of these applications, the engine 32 can be oriented vertically or horizontally. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device 41 in a submerged position when the watercraft 40 rests on a surface of a body of water WL. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies 43. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52 which includes a driveshaft housing 54 and a lower unit 56. The power head 50 is disposed atop the drive unit 34 and includes the internal combustion engine 32 and a protective cowling assembly 60. Preferably, the protective cowling 60, which preferably is made of plastic, defines a generally closed cavity 62 (FIGS. 2–4) in which the engine 32 is disposed. The protective cowling assembly 60 preferably comprises a top cowling member 64 and a bottom cowling member 66. The top cowling member 64 preferably is detachably affixed to the bottom cowling member 66 by a coupling mechanism so that a user, operator, mechanic or repairperson can access the engine 32 for maintenance or for other purposes.

Figure 2:
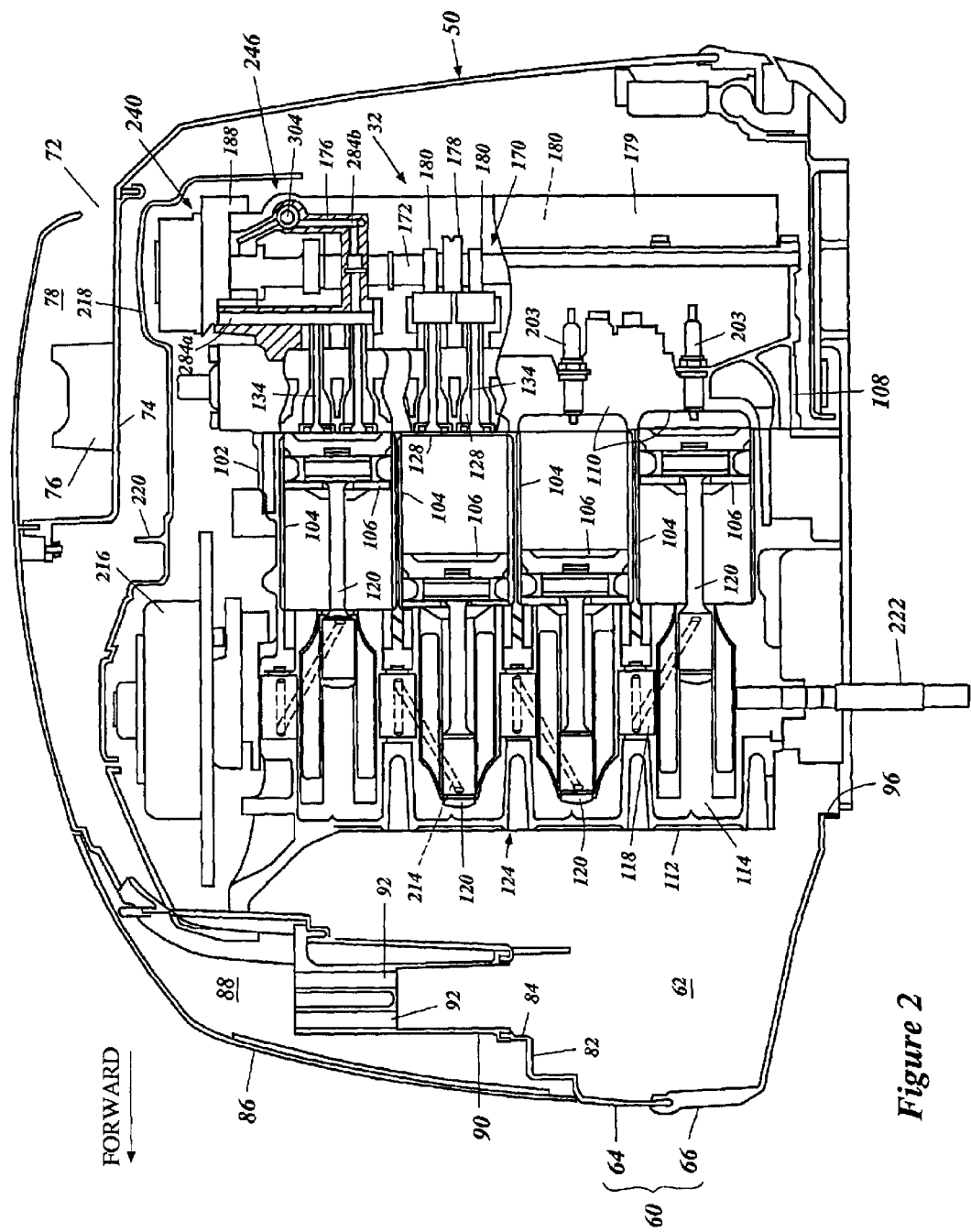
FIG. 2 is an enlarged partial sectional and port side elevational view of a power head of the outboard motor. A camshaft drive mechanism is omitted in this figure except for an intake camshaft sprocket.
Figure 4:
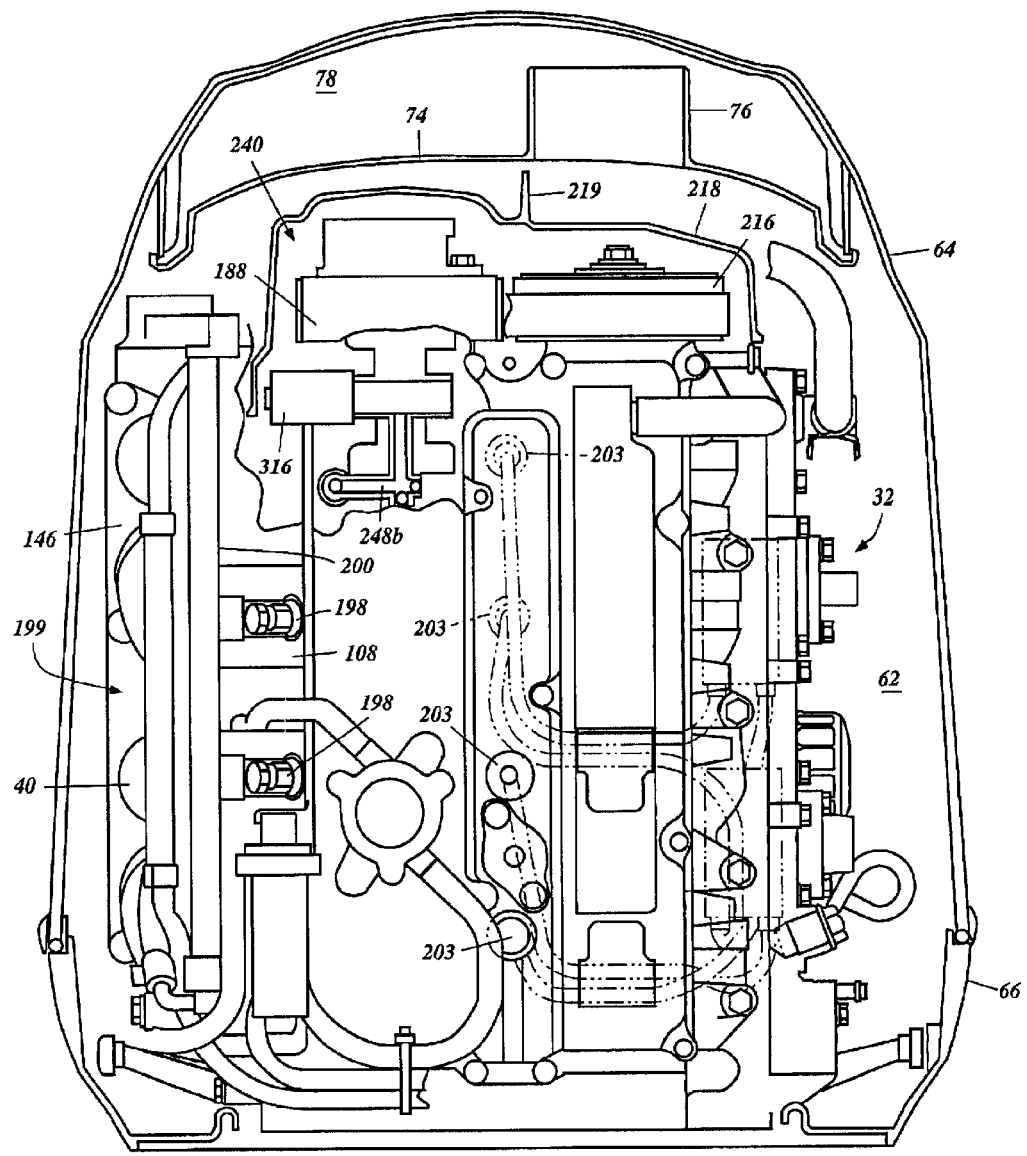
FIG. 4 is a rear elevational view of the power head. The cowling assembly is shown in section.

With reference to FIG. 2, the top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. With particular reference to FIG. 4, the rear air duct 76 preferably is disposed to the starboard side of a central portion of the rear intake member 74.

With reference to FIG. 2, the top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 (FIG. 2) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

Figure 3:
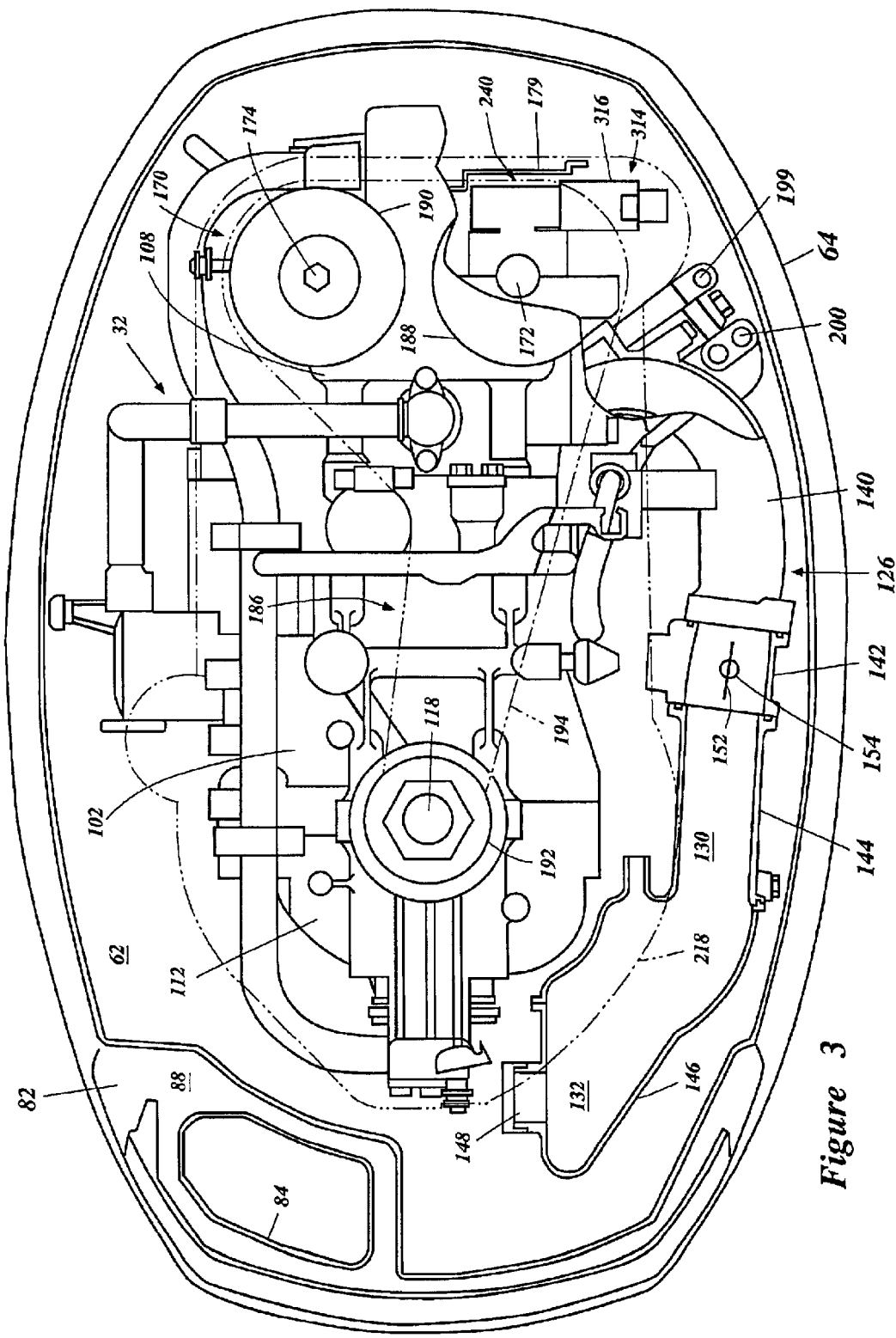
FIG. 3 is a top plan view of the power head. A cowling assembly is shown in section. The engine is partially illustrated in section.

With reference to FIGS. 2–4, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line WL when the associated watercraft 40 is substantially stationary with respect to the water line WL and when the drive unit 34 is not tilted and is placed in the position shown in FIG. 1. The term "vertically" in turn means that portions, members or components extend generally normal to those that extend horizontally.

This type of engine, however, merely exemplifies one type of engine on which various aspects and features of the present invention can be suitably used. Engines having other numbers of cylinders, having other cylinder arrangements (V, opposing, etc.), and operating on other combustion principles (e.g., crankcase compression two-stroke or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A moveable member, such as a reciprocating piston 106, moves relative to the cylinder block 102 in a suitable manner. In the illustrated arrangement, the piston 106 reciprocates within each cylinder bore 104.

A cylinder head member 108 is affixed to one end of the cylinder block 102 to close one end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the forward most position of the engine 32, with the cylinder block 102 and the cylinder head member 108 being disposed rearward from the crankcase member 112. Generally, the cylinder block 102 (or individual cylinder bodies), the cylinder head member 108 and the crankcase member 112 together define an engine body 124. Preferably, at least these major engine portions 102, 108, 112 are made of an aluminum alloy. The aluminum alloy advantageously increases strength over cast iron while decreasing the weight of the engine body 96.

The engine 32 also comprises an air induction system or device 126. The air induction system 126 draws air from within the cavity 62 to the combustion chambers 110. The air induction system 126 preferably comprises eight intake ports 128, four intake passages 130 and a single plenum chamber 132. In the illustrated arrangement, two intake ports 128 are allotted to each combustion chamber 110 and the two intake ports 128 communicate with a single intake passage 130.

The intake ports 128 are defined in the cylinder head member 108. Intake valves 134 are slidably disposed at the intake ports 128 within the cylinder head member 108 to move between an open and a closed position. As such, the valves 134 act to open and close the ports 128 to control the flow of air into the combustion chamber 110.

Biasing members, such as springs 136 (FIG. 5), are used to urge the intake valves 134 toward the respective closed positions by acting against a mounting boss formed on the illustrated cylinder head member 108 and a corresponding retainer 138 that is affixed to each of the valves 134. When each intake valve 134 is in the open position, the intake passage 130 that is associated with the intake port 128 communicates with the associated combustion chamber 110.

With reference to FIG. 3, each intake passage 130 preferably is defined by an intake manifold 140, a throttle body 142 and an intake runner 144. The intake manifold 140 and the throttle body 142 preferably are made of aluminum alloy. The intake runner 144 preferably is made of plastic. A portion of the illustrated intake runner 144 extends forwardly alongside of and to the front of the crankcase member 112.

With continued reference to FIG. 3, the respective portions of the intake runners 144, together with a plenum chamber member 146, define the plenum chamber 132. Preferably, the plenum chamber member 146 also is made of plastic.

The plenum chamber 132 comprises an air inlet 148. The air in the cavity 62 is drawn into the plenum chamber 132 through the air inlet 148. The air is then passed through intake passages 130, the throttle body 142 and the intake manifold 140. Preferably, the plenum chamber 132 acts as an intake silencer to attenuate noise generated by the flow of air into the respective combustion chambers 110.

Each illustrated throttle body 142 has a butterfly type throttle valve 152 journaled for pivotal movement about an axis defined by a generally vertically extending valve shaft 154. Each valve shaft 154 can be coupled with the other valve shafts to allow simultaneous movement. The valve shaft 154 is operable by the operator through an appropriate conventional throttle valve linkage and a throttle lever connected to the end of the linkage. The throttle valves 152 are movable between an open position and a closed position to meter or regulate an amount of air flowing through the respective air intake passages 130. Normally, the greater the opening degree, the higher the rate of airflow and the higher the power output of the engine speed.

In order to bring the engine 32 to idle speed and to maintain this speed, the throttle valves 152 generally are substantially closed. Preferably, the valves are not fully closed to produce a more stable idle speed and to prevent sticking of the throttle valves 152 in the closed position. As used through the description, the term "idle speed" generally means a low engine speed that achieved when the throttle valves 152 are closed but also includes a state such that the valves 152 are slightly more open to allow a relatively small amount of air to flow through the intake passages 130.

The air induction system 126 preferably includes an auxiliary air device (AAD) (not shown) that bypasses the throttle valves 152 and extends from the plenum chamber 132 to the respective intake passages 130 downstream of the throttle valves 152. Idle air can be delivered to the combustion chambers 110 through the AAD when the throttle valves 152 are placed in a substantially closed or closed position.

The AAD preferably comprises an idle air passage, an idle valve and an idle valve actuator. The idle air passage is branched off to the respective intake passages 130. The idle valve controls flow through the idle air passage such that the amount of air flow can be more precisely controlled. Preferably, the idle valve is a needle valve that can move between an open position and a closed position, which closes the idle air passage. The idle valve actuator actuates the idle valve to a certain position to meter or adjust an amount of the idle air.

Figure 8:
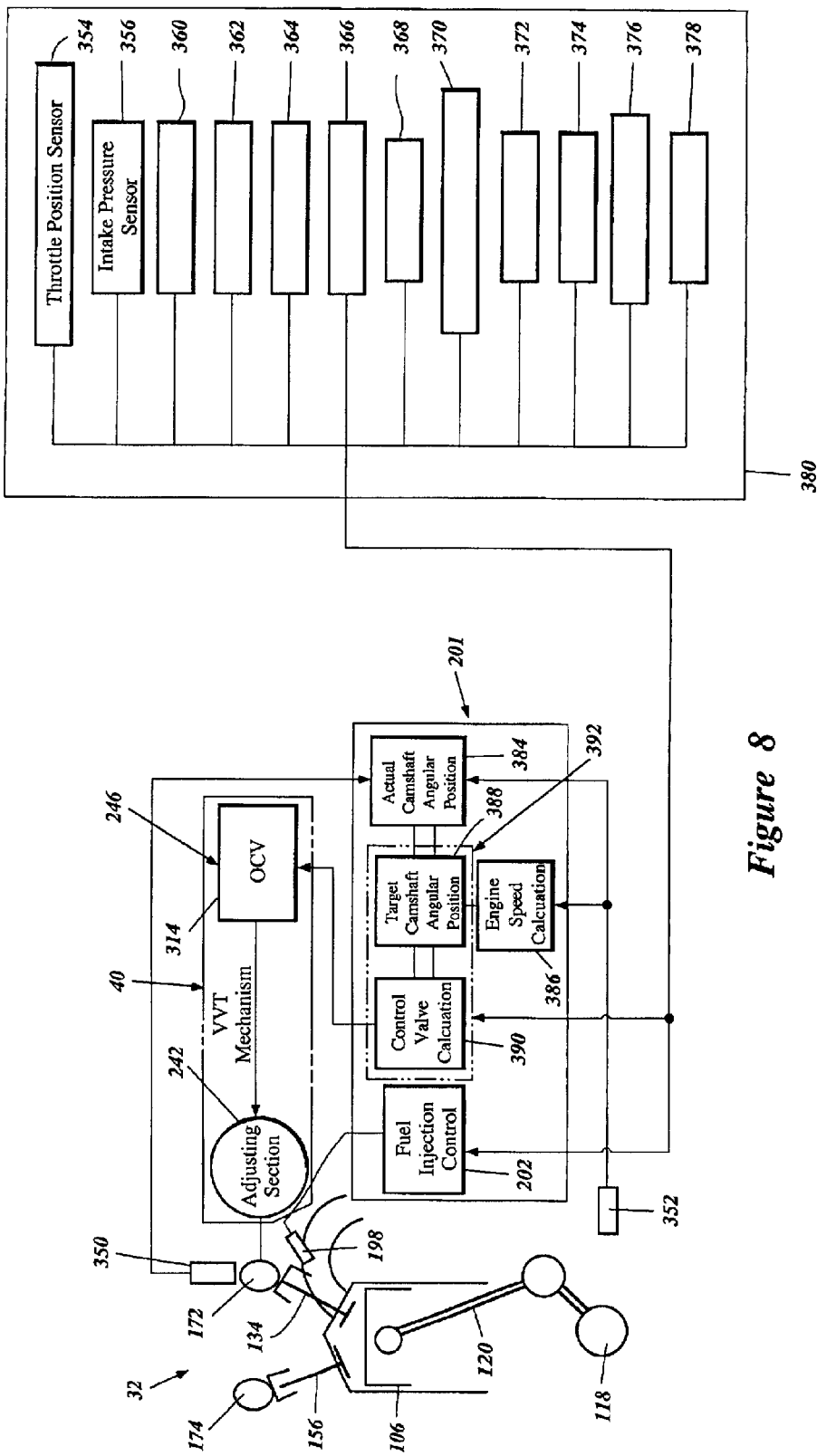
FIG. 8 is a schematic view of a control system of the VVT mechanism.

The engine 32 also comprises an exhaust system that routes burnt charges, i.e., exhaust gases, to a location outside of the outboard motor 30. Each cylinder bore 104 preferably has two exhaust ports (not shown) defined in the cylinder head member 108. The exhaust ports can be selectively opened and closed by exhaust valves. The exhaust valves are schematically illustrated in FIG. 8, described below, and identified by reference numeral 156. The construction of each exhaust valve and the arrangement of the exhaust valves are substantially the same as the intake valves 134 and the arrangement thereof, respectively.

An exhaust manifold (not shown) preferably is disposed next to the exhaust ports (not shown) and extends generally vertically. The exhaust manifold communicates with the combustion chambers 110 through the exhaust ports to collect exhaust gases therefrom. The exhaust manifold is coupled with the foregoing exhaust passage of the exhaust guide member 98. When the exhaust ports are opened, the combustion chambers 110 communicate with the exhaust passage through the exhaust manifold.

Figure 5:
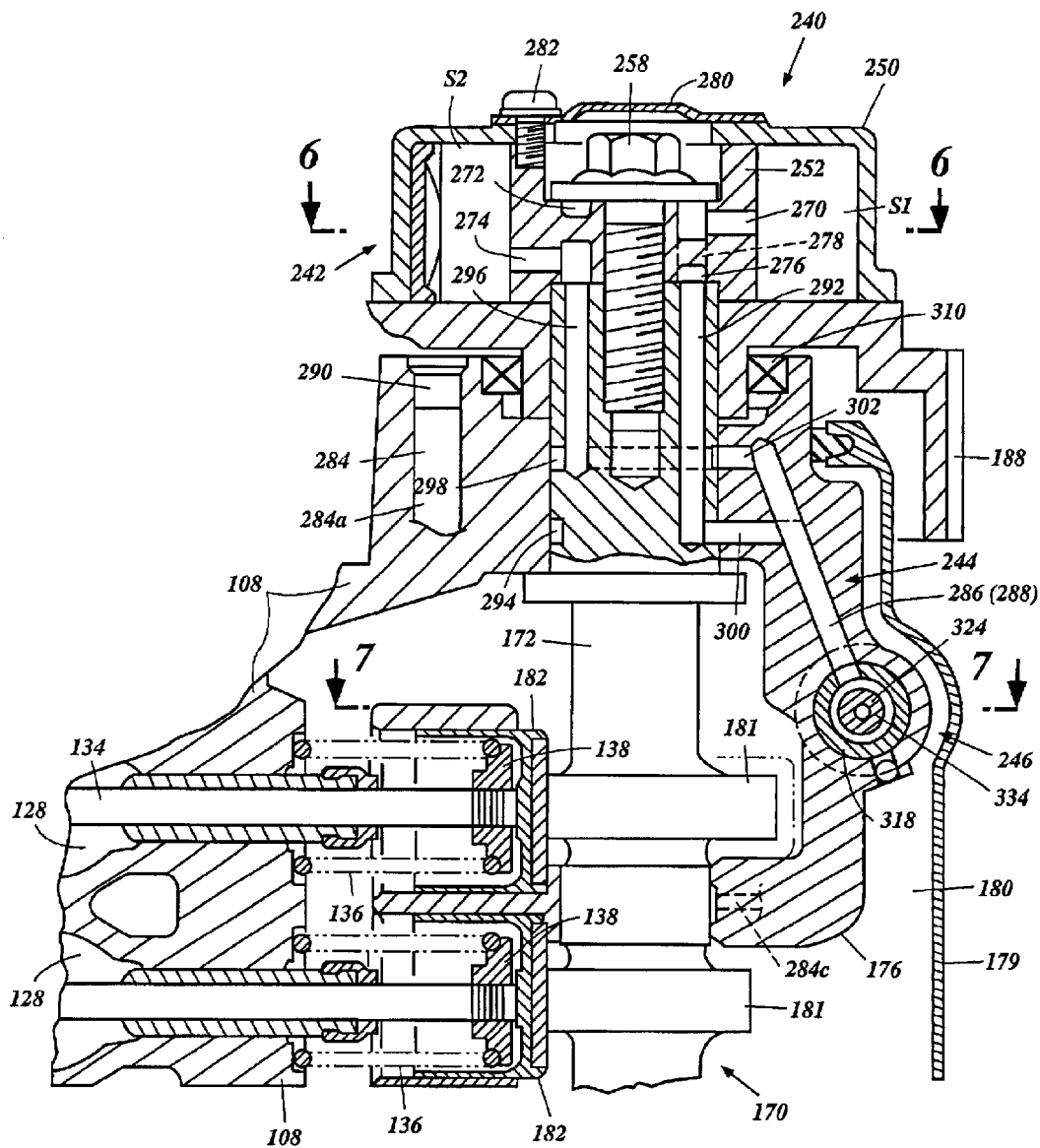
FIG. 5 is an enlarged, sectional side view of the engine illustrating a VVT mechanism thereof.

With particular reference to FIGS. 2, 3 and 5, a valve cam mechanism or valve actuator 170 preferably is provided for actuating the intake valves 134 and the exhaust valves 156 (FIG. 8). In the illustrated arrangement, the valve cam mechanism 170 includes an intake camshaft 172 and an exhaust camshaft 174 both extending generally vertically and journaled for rotation relative to the cylinder head member 108. In the illustrated arrangement, bearing caps 176, 178 (FIG. 2) journal the camshafts 172, 174 with the cylinder head member 108. A camshaft cover 179 is affixed to the cylinder head member 108 to define a camshaft chamber 180 together with the cylinder head member 108.

Each camshaft 172, 174, as shown in FIG. 5, has cam lobes 181 to push valve lifters 182 that are affixed to the respective ends of the intake valves 134 and exhaust valves 156 (FIG. 8) as in any suitable manner. The cam lobes 181 repeatedly push the valve lifters 182 in a timed manner, which is in proportion to the engine speed. The movement of the lifters 182 generally is timed by the rotation of the camshafts 172, 174 to actuate the intake valves 134 and the exhaust valves.

With reference to FIG. 3, a camshaft drive mechanism 186 drives the valve cam mechanism 170. The intake camshaft 172 and the exhaust camshaft 174 include an intake driven sprocket 188 positioned atop the intake camshaft 172 and an exhaust driven sprocket 190 positioned atop the exhaust camshaft 174. The crankshaft 118 has a drive sprocket 192 positioned at an upper portion thereof. Of course, other locations of the sprockets also can be used. The illustrated arrangement, however, advantageously results in a compactly arranged engine.

A timing chain or belt 194 is wound around the driven sprockets 188, 190 and the drive sprocket 192. The crankshaft 118 thus drives the respective camshafts 172, 174 through the timing chain 194 in the timed relationship. Because the camshafts 172, 174 must rotate at half of the speed of the rotation of the crankshaft 118 in the four-cycle combustion principle, a diameter of the driven sprockets 188, 190 is twice as large as a diameter of the drive sprocket 192.

With reference to FIGS. 3 and 4, the engine 32 preferably has a port or manifold fuel injection system. The fuel injection system preferably comprises four fuel injectors 198 with one fuel injector allotted for each of the respective combustion chambers 110 through suitable fuel conduits 199. The fuel injectors 198 are mounted on a fuel rail 200, which is mounted on the cylinder head member 108. The fuel rail 200 also defines a portion of the fuel conduits 199. Each fuel injector 198 preferably has an injection nozzle directed toward the associated intake passage 130 adjacent to the intake ports 134.

The fuel injectors 198 spray fuel into the intake passages 130 under control of an ECU which preferably is mounted on the engine body 124 at an appropriate location. The ECU 201 (FIG. 8) controls both the start timing and the duration of the fuel injection cycle of the fuel injectors 198 so that the nozzles spray a proper amount of the fuel for each combustion cycle. The fuel injection controller within the ECU 201 is illustrated in FIG. 8 with reference numeral 202 and is described below. Of course, the fuel injectors 198 can be disposed for direct cylinder injection and carburetors can replace or accompany the fuel injectors 198.

With reference to FIGS. 2 and 4, the engine 32 further comprises an ignition or firing system. Each combustion chamber 110 is provided with a spark plug 203 that is connected to the ECU 201 (FIG. 8) through an igniter so that ignition timing is also controlled by the ECU 201. Each spark plug 203 has electrodes that are exposed into the associated combustion chamber and are spaced apart from each other with a small gap. The spark plugs 203 generate a spark between the electrodes to ignite an air/fuel charge in the combustion chamber 110 at selected ignition timing under control of the ECU 201.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves 156 (FIG. 8) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 203 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the body of water. The cooling system includes one or more water jackets defined within the engine body 124 through which the water travels to remove heat from the engine body 124.

The engine 32 also preferably includes a lubrication system. A closed-loop type system is employed in the illustrated embodiment. The lubrication system comprises a lubricant tank defining a reservoir, which preferably is positioned within the driveshaft housing 54. An oil pump (not shown) is provided at a desired location, such as atop the driveshaft housing 54, to pressurize the lubricant oil in the reservoir and to pass the lubricant oil through a suction pipe toward certain engine portions, which desirably are lubricated, through lubricant delivery passages. The engine portions that need lubrication include, for example, the crankshaft bearings (not shown), the connecting rods 120 and the pistons 106. Portions 214 of the delivery passages (FIG. 2) can be defined in the crankshaft 118. Lubricant return passages (not shown) also are provided to return the oil to the lubricant tank for re-circulation.

A flywheel assembly 216 (FIG. 2) preferably is positioned at an upper end of the crankshaft 118 and is mounted for rotation with the crankshaft 118. The flywheel assembly 216 comprises a flywheel magneto or AC generator that supplies electric power to various electrical components such as the fuel injection system, the ignition system and the ECU 201 (FIG. 8). A protective cover 218, which preferably is made of plastic, extends over majority of the top surface of the engine 32 and preferably covers the portion that includes the fly wheel assembly 216 and the camshaft drive mechanism 186.

The protective cover 218 preferably has a rib 219 (FIG. 4) that reduces or eliminates the amount of air flowing directly toward the engine portion that has the air induction system 126, i.e., to the portion on the starboard side. The protective cover 218 also preferably has a rib 220 (FIG. 2) that substantially or completely inhibits air from flowing directly toward a front portion of the engine body 124. The ribs 219, 222 advantageously help direct the airflow around the engine body 124 to cool the engine body 124. As seen in FIG. 2, a bottom portion, at least in part, of the protective cover 218 desirably is left open to allow heat to radiate from the engine 32.

With reference to FIG. 1, the driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

With continued reference to FIG. 1, the lower unit 56 depends from the driveshaft housing 54 and supports a propulsion shaft 226 that is driven by the driveshaft 222. The propulsion shaft 226 extends generally horizontally through the lower unit 56 and is journaled for rotation. The propulsion device 41 is attached to the propulsion shaft 226. In the illustrated arrangement, the propulsion device includes a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The outboard motor 30 has a clutch mechanism that allows the transmission 232 to change the rotational direction of the propeller 228 among forward, neutral or reverse.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then a discharge section defined within the hub of the propeller 228.

VVT Mechanism

With continued reference to FIGS. 2–5 and with additional reference to FIGS. 6 and 7, a VVT mechanism 240 is described below.

The VVT mechanism 240 preferably is configured to adjust the angular position of the intake camshaft 172 relative to the intake driven sprocket 188 between two limits, i.e., a fully advanced angular position and a fully retarded angular position. At the fully advanced angular position, the intake camshaft 172 opens and closes the intake valves 134 at a most advanced timing. In contrast, at the fully retarded angular position, the intake camshaft 172 opens and closes the intake valves 134 at a most retarded timing.

The VVT mechanism 240 preferably is hydraulically operated and thus comprises an adjusting section 242, a fluid supply section 244 and a control section 246. The adjusting section 242 sets the intake camshaft 172 to the certain angular position in response to a volume of working fluid that is allotted to two spaces of the adjusting section 242. The fluid supply section 244 preferably supplies a portion of the lubricant, which is use primarily for the lubrication system, to the adjusting section 242 as the working fluid. The control section 246 selects the rate or amount of the fluid directed to the adjusting section 242 under control of the ECU 201 (FIG. 8).

The adjusting section 242 preferably includes an outer housing 250 and an inner rotor 252. The outer housing 250 is affixed to the intake driven sprocket 188 by three bolts 254 in the illustrated arrangement and preferably forms three chambers 256 (FIG. 6) between the three bolts 254. Any other suitable fastening technique and any suitable number of chambers 256 can be used.

The inner rotor 252 is affixed atop the intake camshaft 172 by a bolt 258 and has three vanes 260 extending into the respective chambers 256 of the housing 250. The number of vanes 260 can be varied and the inner rotor 252 can be attached to the camshaft 172 in any suitable manners.

Figure 6:
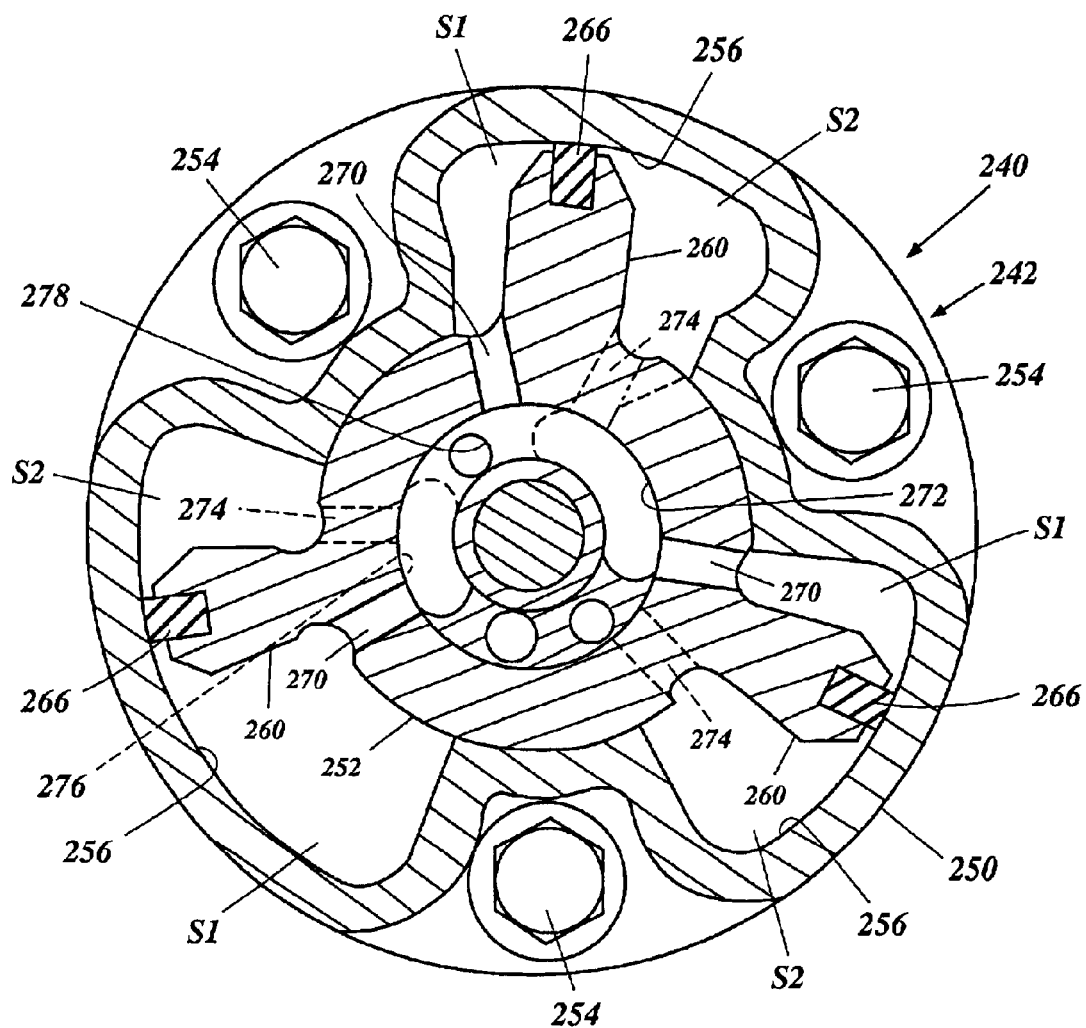
FIG. 6 is a sectional view of the VVT mechanism taken along the line 6—6 of FIG. 5.

With reference to FIG. 6, the vanes 260 preferably extend radially and are spaced apart from each other with an angle of about 120 degrees. The two sides of the vane 260, together with the walls of each chamber 256 define a first space S1 and a second space S2 respectively. Seal members 266 carried by the respective vanes 260 abut an inner surface of the housing 250 and thereby substantially seal the first and second spaces S1, S2 from each other.

The respective first spaces S1 communicate with one another through respective pathways 270 and a passage 272 that is formed on an upper surface of the rotor 252 and extends partially around the bolt 258. The respective second spaces S2 communicate with one another through pathways 274 and a passage 276 which is formed on a lower surface of the rotor 252 and extends partially around the bolt 258. The passages 272, 276 generally are configured as an incomplete circular shape and can be offset from one another (e.g., a 60 degree offset may be used).

A pathway 278 extends from the passage 272 to a bottom portion of the rotor 252 between the ends of the passage 276. A cover member 280 is affixed to the outer housing 250 by screws 282 to cover the bolt 258. The passages 272, 276 allow fluid communication with the respective pathways 270, 274, 278 during rotation of the camshaft 172.

With reference to FIGS. 2 and 5, the fluid supply section 244 preferably includes a supply passage 284 and two delivery passages 286, 288. The supply passage 284 and the delivery passages 286, 288 communicate with one another through the control section 246. The supply passage 284 preferably has a passage portion 284a (FIGS. 2 and 5) defined in the cylinder head member 108 and a passage portion 284b (FIG. 2) defined in the bearing cap 176. The passage portion 284a is connected to the lubrication system, while the passage portion 284b is connected to the control section 246. Thus, the lubricant oil of the lubrication system is supplied to the control section 246 through the fluid supply passage 284.

The supply passage 284 communicates with the lubrication system so that a portion of the lubricant oil is supplied to the VVT mechanism 240 through the passage portions 284a, 284b. Because the passage portion 284a is formed by a drilling process in the illustrated embodiment, a closure member 290 closes one end of the passage portion 284a. The passage portion 284b is branched off to a camshaft lubrication passage 284c (FIG. 5) which delivers lubricant for lubrication of a journal of the camshaft 172.

The delivery passages 286, 288 preferably are defined in a top portion of the camshaft 172 and the bearing cap 176. A portion of the delivery passage 286 formed in the camshaft 172 includes a pathway 292 that extends generally vertically and that communicates with the pathway 278 that communicates with the passage 272 of the first space S1. The pathway 292 also communicates with a passage 294 that is formed as a recess in the outer surface of the camshaft 172.

A portion of the delivery passage 288 formed in the camshaft 172, in turn, includes a pathway 296 that extends generally vertically and communicates with the passage 276 of the second space S2. The pathway 296 also communicates with a passage 298 that is formed as a recess in the outer surface of the camshaft 172.

A portion of the delivery passage 286 formed in the bearing cap 176 includes a pathway 300 that extends generally vertically and generally horizontally to communicate with the passage 294. Similarly, a portion of the delivery passage 288 formed in the bearing cap 176 includes a pathway 302 that extends generally vertically and generally horizontally to communicate with the passage 298. The other ends of the pathways 300, 302 communicate with a common chamber 304 formed in the control section 246 through ports 306, 308, respectively.

A seal member 310 (FIG. 5) is inserted between the cylinder head member 108, the camshaft 172 and the bearing cap 176 to inhibit the lubricant from leaking out. It should be noted that FIGS. 5 and 7 illustrate the delivery passages 286, 288 in a schematic fashion. The passages 286, 288 do not merge together.

Figure 7:
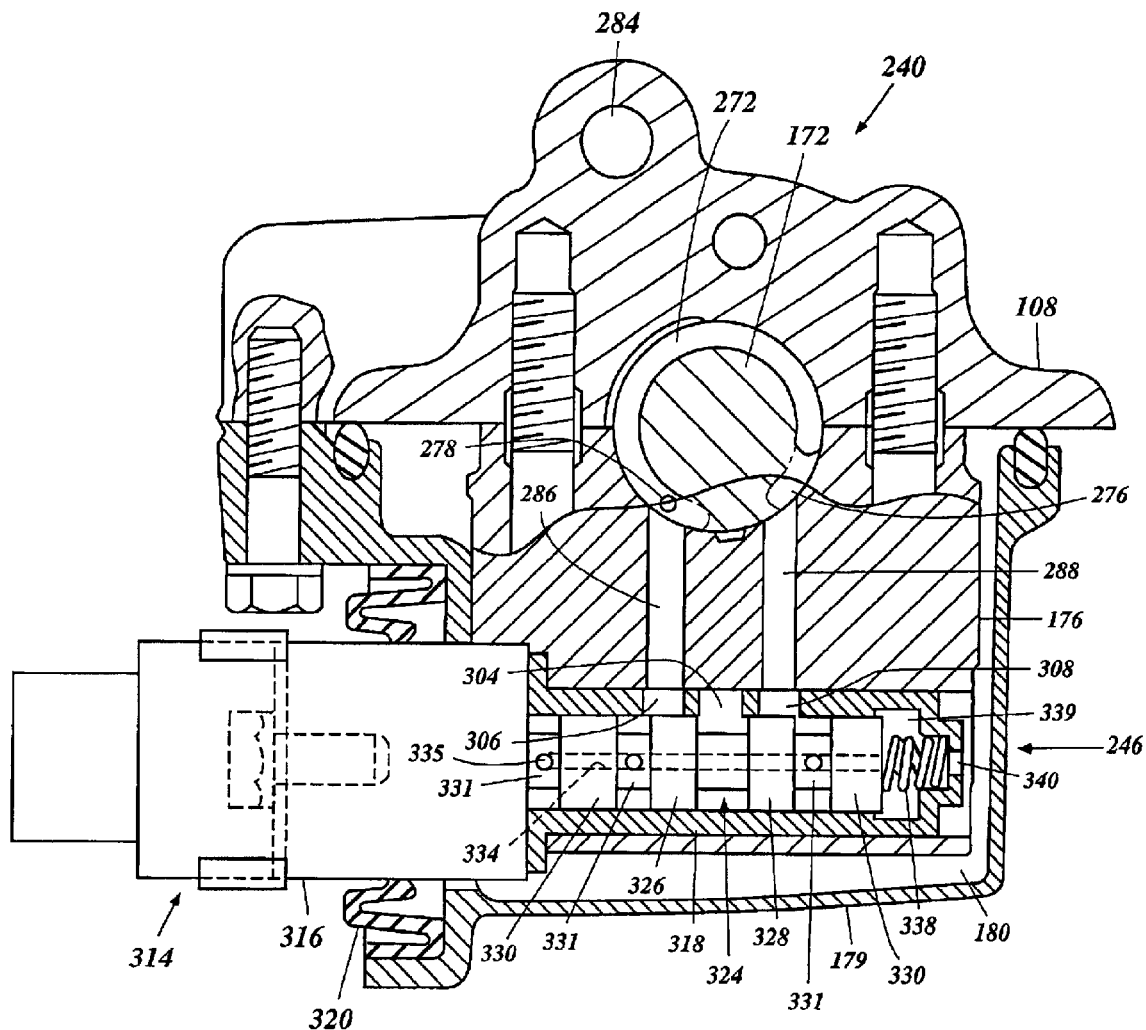
FIG. 7 is a sectional view of the VVT mechanism taken along the line 7—7 of FIG. 5.

The control section 246 preferably includes an oil control valve (OCV) 314 (FIG. 7). The OCV 314 comprises a housing section 316 and a cylinder section 318. Both the housing and cylinder sections 316, 318 preferably are received in the bearing cap 176. Because the sections 316, 318 together extend through a hole of the camshaft cover 179, a bellow 320 made of rubber is provided between the housing section 316 and the camshaft cover 179 to close and seal the hole.

The cylinder section 318 defines the common chamber 304 that communicates with the supply passage 284 and the delivery passages 286, 288. The housing section 316 preferably encloses a solenoid type actuator, although other actuators of course are available.

A rod 324 extends into the common chamber 304 from the actuator and is axially movable therein. The rod 324 has a pair of valves 326, 328 and a pair of guide portions 330. The valves 326, 328 and the guide portions 330 have an outer diameter that is larger than an outer diameter of the remainder portions 331 of the rod 324 and is generally equal to an inner diameter of the cylinder section 318. The rod 324 defines an internal passage 334 extending through the rod 324 and apertures 335 communicating with the passage 334 and the common chamber 304 to allow free flow of the lubricant in the chamber 304.

A coil spring 338 is retained in a spring retaining space 339 at an end of the cylinder 318 opposite to the housing section 316 to urge the rod 324 toward the actuator. The lubricant can be drained to the camshaft chamber 180 through the spring retaining chamber 339 and a drain hole 340.

The actuator, i.e., solenoid, actuates the rod 324 under control of the ECU 201 (FIG. 8) so that the rod 324 can take any position in the chamber 304. More specifically, the solenoid pushes the rod 324 toward a position in compliance with commands of the ECU 201. If a certain position designated by the ECU 201 is closer to the solenoid than a current position, then the solenoid does not actuate the rod 324 and the coil spring 338 pushes back the rod 324 to the desired position. Alternatively, the solenoid pulls the rod 324 back to the position.

The valve 326 can close the port 306 entirely or partially, and the valve 328 can close the port 308 entirely or partially. The extent to which the valves 326, 328 allow the ports 306, 308 to communicate with the chamber 304 determines an amount of the lubricant that is allotted to each delivery passage 286, 288 and to each space S1, S2 in the adjusting section 242. The amount of lubricant delivered to each space S1, S2 thus determines an angular position of the camshaft 172. If more lubricant is allotted to the first space S1 than to the second space S2, the camshaft 172 is adjusted closer to the fully advanced position, and vise versa.

In operation, the oil pump pressurizes the lubricant oil to the supply passage 284 and further to the common chamber 304 of the cylinder 318. Meanwhile, the ECU 201 (FIG. 8) controls the solenoid. The solenoid moves the rod 324 and thus adjusts the degree to which the valves 326, 328 allow the chamber 304 to communicate with the ports 306, 308, respectively. The ECU thereby controls the angular position of the camshaft 172. Preferably, a drain is provided to allow the lubricant oil to drain from the space that is being evacuated while pressurized lubricant oil flows into the opposing space.

In one mode of operation, for example, the lubricant oil is fed to the common chamber 304 of the cylinder 318. Thus, the common chamber 304 has a positive pressure. To move the camshaft 172 in a first direction relative to the input sprocket 188, the common chamber 304 is linked with the delivery passage 286 while the other of the delivery passage 288 is linked to a drain. Thus, pressurized oil will flow into the first space S1 while oil will be displaced from the second space S2. The displaced oil flows through the passage 338 and to the drain 340 and thereby returns to the lubrication system. Once the desired movement has occurred, the rod 324 is returned to a neutral position in which the common chamber 304 is no longer communicating with either of the delivery passages 286, 288. Additionally, in the neutral position, neither of the delivery passages 286, 288 communicates with the drain in one particularly advantageous arrangement. Of course, by varying the placement and size of the seals, a constant flow can be produced from supply to drain while the rod 324 is in a neutral position. Also, a constant flow into the delivery lines also can be constructed. In the illustrated arrangement, however, no flow preferably occurs with the system in a neutral position.

The engine and the VVT mechanism are disclosed in, for example, a co-pending U.S. application filed Jun. 11, 2001, titled FOUR-CYCLE ENGINE FOR MARINE DRIVE, which Ser. No. is 09/878,323, the entire contents of which is hereby expressly incorporated by reference.

Control System

With reference to FIG. 8, a valve timing control system of the VVT mechanism 40 using the ECU 201 is described below.

FIG. 8 schematically illustrates the engine 32. The illustrated ECU 201 adjusts the valve timing of the intake valves 134 by changing the angular positions of the intake camshaft 172 relative to the pulley 188 through the VVT mechanism, 40. The ECU 201 also controls the fuel injectors 198 using the fuel injection control unit 202. The ECU 201 is connected to the OCV 314 as the control section 246 of the VVT mechanism 40 and the fuel injectors through control signal lines.

In order to control the VVT mechanism 40 and the fuel injectors 198, the ECU 201 can employ various sensors which sense operational conditions of the engine 32 and/or the outboard motor 30. In the present system, the ECU 201 at least uses a camshaft angle position sensor 350, a crankshaft angle position sensor 352, a throttle position sensor (or throttle valve opening degree sensor) 354 and an intake pressure sensor 356. The ECU 201 is connected to the sensors 350, 352, 354, 356 through sensor signal lines.

The camshaft angle position sensor 350 is associated with the intake camshaft 172 to sense an angular position of the intake camshaft 172 and sends a camshaft angle position signal to the ECU 201 through the signal line. The crankshaft angle position sensor 352 is associated with the crankshaft 118 to sense an angle position of the crankshaft 118 and sends a crankshaft angular position signal to the ECU 201 through the signal line.

Both the camshaft angle position sensor 350 and the crankshaft angle position sensor 352 in the present system generate pulses as the respective signals. The pulse of the camshaft position sensor 350 can give an actual angular position of the camshaft 172. The crankshaft position signal together with the camshaft position signal allows the ECU 201 to accurately determine the position of the camshaft 172 in relation to the crankshaft 118.

The throttle position sensor 354 preferably is disposed atop the valve shaft 154 to sense an angular position between the open and closed angular positions of the throttle valves 152 and sends a throttle valve position signal to the ECU 201 through the signal lines.

The intake sensor 356 preferably is disposed either within one of the intake passages 130 or within the plenum chamber 132 to sense an intake pressure therein. Because the respective intake passages 130 are formed such that each generally is the same size as the others, and because the plenum chamber 132 collects a large volume of air that is supplied to each of the intake passages 130, every passage 130 has substantially equal pressure and a signal of the intake pressure sensor 356 thus can represent a condition of the respective pressure. Thus, it should be appreciated that a single pressure sensor or multiple pressure sensors can be used.

The throttle valve position sensor 354 and the intake pressure sensor 356 preferably are selected from a type of sensor that indirectly senses an amount of air in the induction system. Another type of sensor that directly senses the air amount, of course, can be applicable. For example, moving vane types, heated wire types and Karman Vortex types of air flow meters also can be used.

The operator's demand or engine load, as determined by the throttle opening degree, is sensed by the throttle position sensor 354. Generally, in proportion to the change of the throttle opening degree, the intake air pressure also varies and is sensed by the intake pressure sensor 356. The throttle valve 152 (FIG. 3) is opened when the operator operates the throttle lever to increase power output of the engine 32 and thus the speed of the watercraft 40. The intake pressure almost simultaneously decreases as the throttle valve 152 opens.

The engine load can also increase when the associated watercraft 40 advances against wind. In this situation, the operator also operates the throttle lever to recover the speed that may be lost. Therefore, as used in this description, the term "acceleration" means not only the acceleration in the narrow sense but also the recovery of speed by the operator in a broad sense. Also, the term "sudden acceleration" means the sudden acceleration in the narrow sense and a quick recovery of speed by the operator in a broad sense.

The signal lines preferably are configured with hard-wires or wire-harnesses. The signals can be sent through emitter and detector pairs, infrated radiation, radio waves or the like. The type of signal and the type of connection can be varied between sensors or the same type can be used with all sensors which are described above and additional sensors described below.

Signals from other sensors or control signals also can be used for the control by the ECU 201. In the present control system, various sensors other than the sensors 350, 352, 354, 356 are also provided to sense the operational condition of the engine 32 and/or the outboard motor 30. For example, an oil pressure sensor 360, a water temperature sensor 362, an engine body temperature sensor 364, a knock sensor 366, a transmission position sensor 368, an oxygen sensor 370 for determining a current air/fuel ratio, and an intake air temperature sensor 372 are provided in the present control system. The sensors except for the transmission position sensor 368, can sense the operational conditions of the engine 32 and send signals to the ECU 201 through respective sensor signal lines. The transmission position sensor 368 senses whether the transmission 232 (FIG. 1) is placed at the forward, neutral or reverse position and sends a transmission position signal to the ECU 201 through the signal line. An ignition control signal 374, a fuel injection control signal 376, and an AAD control signal 378 are also used by the ECU 201 for control of the spark plugs 203 (FIG. 2), the fuel injectors 198, and the AAD (not shown), respectively. The foregoing sensors 350–372 and the control signals 374–378, in a broad sense, define sensors 380 that sense operational conditions of the engine and/or the outboard motor.

The ECU 201 can be designed as a feedback control device using the signals of the sensors. The ECU 201 preferably has a central processing unit (CPU) and some storage units which stores various control maps typically defining relationships between parameters such as, for example, the engine speed, the throttle valve position and the intake pressure (and/or an amount of intake air) to determine an optimum control conditions. The ECU 201 then controls the VVT mechanism 40, the fuel injectors 198 and other actuators in accordance with the determined control condition.

The fuel injection control unit 202 can be in the form of a hard-wired circuit, a dedicated processor and memory, or a general purpose processor and memory running a control program. Other units described below, can also be constructed as a hard-wired circuit, a dedicated processor and memory, or a general purpose processor and memory running one or a plurality of control programs. However, for easier understanding of the reader, the units will be described as if they were discriminate and substantial units. The illustrated fuel injection control unit 202 controls the fuel injectors 198 using at least the throttle position signal from the throttle position sensor 354 and the intake pressure signal from the intake pressure sensor 356.

The ECU 201 preferably comprises, other than the fuel injection control unit 202, an actual camshaft angular position calculation (ACAPC) unit 384, an engine speed calculation unit 386, a target camshaft angular position calculation (TCAPC) unit 388, and a control value calculation unit 390. The TCAPC unit 388 and the control value calculation unit 390 together form an OCV control section 392 in the illustrated ECU configuration.

The ACAPC unit 384 preferably receives the actual camshaft angular position signal from the camshaft angle position sensor 350 and the crankshaft angular position signal, which gives two possible ranges of camshaft angular position, from the crankshaft angle position sensor 352. The ACAPC unit 384 then calculates a deviation value which indicates how much the actual camshaft angular position deviates within the two possible ranges of camshaft angular position.

The engine speed calculation unit 386 receives the crankshaft angular position signal from the crankshaft angle position sensor 352 and calculates an engine speed using the signal versus time.

The TCAPC unit 388 receives the deviation value from the ACAPC unit 384, the engine speed from the engine speed calculation unit 386 and at least one of the throttle valve opening degree signal from the throttle valve position sensor 354 and the intake pressure signal from the intake pressure sensor 356. The TCAPC unit 388 then calculates a target camshaft angular, position based upon the deviation value, the engine speed and either the throttle valve opening degree signal or the intake pressure signal.

The control value calculation unit 390 receives the target camshaft angular position from the TCAPC unit 388 and calculates a control value of the OCV 314 of the VVT mechanism 40. That is, the control value calculation unit 390 determines how much oil should be delivered to either the space S1 or the space S2 of the adjusting section 242 of the VVT mechanism 40 based upon the target camshaft angular position.

Under a normal running condition and an ordinary acceleration condition (i.e., not sudden acceleration condition), the ECU 201 preferably uses either a combination of the throttle valve opening degree signal with the engine speed signal ($\alpha$-N method) or a combination of the intake pressure signal with the engine speed signal (D-j method) to calculate the target camshaft angular position. Otherwise, the ECU 201 can use a mixed combination of the $\alpha$-N method and the D-j method under the normal running condition or the ordinary acceleration condition. The $\alpha$-N method, the D-j method and the mixed combination thereof are disclosed in, for example, a co-pending U.S. application filed Feb. 14, 2002, titled CONTROL SYSTEM FOR MARINE ENGINE, which Ser. No. is 10/078,275, the entire contents of which is hereby expressly incorporated by reference. An air amount signal sensed by the air flow meter noted above can be applied additionally or instead either the intake pressure signal or the throttle opening degree signal.

Under a sudden acceleration condition, the illustrated ECU 201 uses only the throttle opening degree signal. That is, the ECU 201 always determines, at least prior to controlling the OCV 314 with the OCV control section 392, whether the operator wishes sudden acceleration or not. The sudden acceleration condition preferably is determined when a change rate of the throttle opening degree signal, a change rate of the intake pressure signal or a change rate of the engine speed calculated by the engine speed calculation unit 386 becomes greater than a predetermined magnitude. A change rate of the air amount signal also can be used to determine the sudden acceleration condition. Theoretically, the predetermined magnitude can be set at any magnitude larger than zero.

Figure 9:
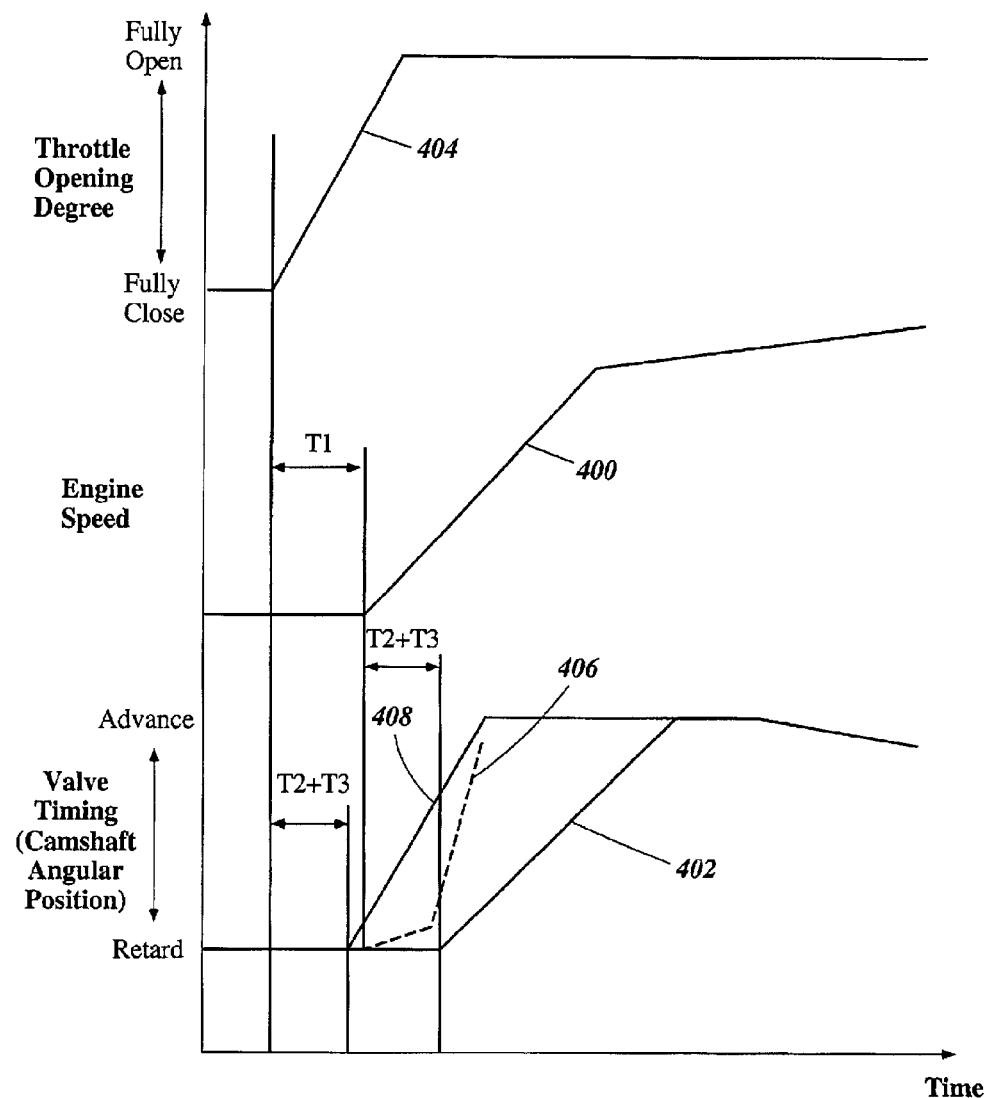
FIG. 9 is a schematic timing diagram illustrating a relationship between a throttle opening, an engine speed of the engine and a valve timing controlled by the control system. The timing diagram also includes a valve timing not controlled by the control system for comparison.

FIG. 9 schematically illustrates how the engine speed 400 changes and how the valve timing (i.e., camshaft angular position) 402 is controlled with the throttle opening degree 404 increasing. The engine speed 400 starts increasing later than the throttle opening degree 404 starts increasing with delay time T1. This delay time T1 is essential because the change of the engine speed always depends from the change of the throttle opening degree. Further, the valve timing 402 starts advancing later than the engine speed 400 starts increasing with delay time T2 which is caused by electrical response delay plus delay time T3 which is caused by mechanical response delay. This behavior is represented by the dashed line 406.

These delays do not cause any significant problems when the engine operates under either the normal running condition or the ordinary acceleration condition. However, the delay time T1+T2+T3 cannot be ignored when the engine operates under the sudden acceleration condition. If the valve timing starts advancing with the delay time T1+T2+T3, an error from the characteristic 406 can be unacceptable. Therefore, the ECU 201 in the present control system uses only the throttle opening degree signal to calculate the target camshaft angular position. As such, the delay time can be reduced to the time T2+T3, illustrated by line 408.

Alternatively, the ECU 201 can use either the air intake pressure signal or the air amount signal instead of the throttle opening degree signal during a sudden acceleration scenario.

Also, the ECU 201 can set a particular and fixed camshaft angular position as the target camshaft angular position when the sudden acceleration condition is determined. The particular and fixed camshaft angular position can be a fully advanced camshaft angular position.

Of course, the foregoing description is that of preferred controls having certain features, aspects and advantages in accordance with the present invention. Various changes and modifications also may be made to the above-described controls without departing from the spirit and scope of the invention, as defined by the claims.

What is claimed is:

1. A method for controlling an internal combustion engine including an intake valve, a valve actuator configured to actuate the intake valve, and a change mechanism configured to change a timing of the valve actuator at which the valve actuator actuates the intake valve, the method comprising determining whether an acceleration of the engine is one of a plurality of degrees of acceleration including at least a sudden acceleration and a gradual acceleration state of the engine based upon an operational condition of the engine, and controlling the change mechanism to advance the actuating timing to a preset timing that does not vary with a speed of the engine when the sudden acceleration is determined.

2. The method as set forth in claim 1, wherein the preset timing is a fixed timing.

3. The method as set forth in claim 2, wherein the preset timing is a generally fully advanced timing.

4. The method as set forth in claim 1, wherein controlling comprises controlling the control device to control the change mechanism to immediately advance the timing to the preset timing when the control device determines the sudden acceleration state.

5. The method as set forth in claim 4, wherein determining comprises determining whether or not a detected acceleration is sudden, and wherein controlling comprises controlling the change mechanism to immediately advance the timing to the preset timing only if the control device determines the acceleration is sudden.

6. The method as set forth in claim 1 additionally comprising controlling the change mechanism to advance the actuating timing varying with the speed of the engine when the gradual acceleration is determined.

7. The method as set forth in claim 6, wherein gradual acceleration is ordinary acceleration.

8. A method for controlling an internal combustion engine including an intake valve, a valve actuator configured to actuate the intake valve, and a change mechanism configured to change a timing of the valve actuator at which the valve actuator actuates the intake valve, the method comprising determining whether an acceleration of the engine is one of a plurality of degrees of acceleration including at least a sudden acceleration and a gradual acceleration state of the engine based upon an operational condition of the engine, sensing one of a throttle opening, an intake pressure and an air amount, and controlling the change mechanism to advance the actuating timing based only upon at least one of the sensed throttle opening degree, the air intake pressure or the air amount when the sudden acceleration state is determined.

9. The method as set forth in claim 8 additionally comprising calculating one of a change rate of the throttle opening, a change rate of the intake pressure and a change rate of the air amount or a change rate of the operational condition of the engine, wherein the sudden acceleration state is determined when the calculated change rate is greater than a predetermined magnitude.

10. The method as set forth in claim 8, wherein controlling comprises controlling the control device to control the change mechanism to immediately advance the timing to the preset timing when the control device determines the sudden acceleration state.

11. The method as set forth in claim 10, wherein determining comprises determining whether or not a detected acceleration is sudden, and wherein controlling comprises controlling the change mechanism to immediately advance the timing to the preset timing only if the control device determines the acceleration is sudden.

12. The method as set forth in claim 8, the change mechanism is controlled such that the actuating timing is not changes in accordance with changes in a speed of the engine during the sudden acceleration state.

13. The method as set forth in claim 12 additionally comprising controlling the change mechanism to adjust the timing based on engine speed during the gradual acceleration state.

14. The method as set forth in claim 12, wherein the gradual acceleration state is an ordinary acceleration state.

15. An internal combustion engine for a marine drive comprising an engine body, a movable member movable relative to the engine body, the engine body and the movable member together defining a combustion chamber, the engine body defining an air intake port communicating with the combustion chamber, an air induction device communicating with the air intake port to introduce air to the combustion chamber through the air intake port, an air intake valve arranged to move between an open position and a closed position of the intake port, a valve actuator configured to actuate the intake valve, a change mechanism configured to change a timing of the valve actuator at which the valve actuator actuates the intake valve, a control device configured to control the change mechanism, and at least one sensor sensing an operational condition of the engine and sending a signal to the control device, the control device being configured to determine whether a state of the engine corresponds to one of a plurality of degrees of acceleration including at least sudden acceleration and gradual acceleration based upon the signal, the control device configured to control the change mechanism to advance the timing to a preset timing without varying the preset timing with a speed of the engine when the control device determines the sudden acceleration state.

16. The engine as set forth in claim 15, wherein the preset timing is a fixed timing.

17. The engine as set forth in claim 15, wherein the preset actuating timing is a generally fully advanced timing.

18. The engine as set forth in claim 15, wherein the control device is configured to the sudden acceleration state when a change rate of the signal becomes greater than a predetermined magnitude.

19. The engine as set forth in claim 18 additionally comprising an output shaft coupled with the movable member for rotation with the movable member, the another sensor including a sensor sensing an angular position of the output shaft and sending an angular position signal to the control device, the control device being configured to calculate a rotational speed of the output shaft based upon the angular position signal, the calculated rotational speed comprises the signal.

20. The engine as set forth in claim 15, wherein the air induction device includes a throttle valve configured to regulate an amount of the air, the sensor being configured to detect an opening amount of the throttle valve and to transmit a throttle opening signal to the control device as the signal.

21. The engine as set forth in claim 15, wherein the sensor is configured to detect an intake pressure in the air induction device and to transmit an intake pressure signal to the control device as the signal.

22. The engine as set forth in claim 15, wherein the sensor is configured to detect an amount of the air and to transmit an air amount signal to the control device as the signal.

23. The engine as set forth in claim 15, wherein the valve actuator includes an intake camshaft journaled on the engine body for rotation, the intake camshaft defines a cam lobe configured to actuate the intake valve, the change mechanism being configured to change the angular position of the camshaft relative to the engine body.

24. The engine as set forth in claim 15, wherein the control device is configured to control the change mechanism to immediately advance the timing to the preset timing when the control device determines the sudden acceleration state.

25. The engine as set forth in claim 24, wherein the control device is configured to determine whether or not a detected acceleration is sudden, and to control the change mechanism to immediately advance the timing to the preset timing only if the control device determines the acceleration is sudden.

26. The engine as set forth in claim 15, wherein the control device is configured to vary the timing with changes in engine speed when the control device determines the gradual acceleration state.

27. The engine as set forth in claim 26, wherein the gradual acceleration state is an ordinary acceleration state.

28. An internal combustion engine for a marine drive comprising an engine body, a movable member movable relative to the engine body, the engine body and the movable member together defining a combustion chamber, the engine body defining an air intake port communicating with the combustion chamber, an air induction device communicating with the air intake port to introduce air to the combustion chamber through the air intake port, the air induction device including a throttle valve arranged to regulate an amount of the air, an air intake valve configured to move between an open position and a closed position of the intake port, a valve actuator configured to actuate the intake valve, a change mechanism configured to change a timing of the valve actuator at which the valve actuator actuates the intake valve, a control device configured to control the change mechanism, and at least one sensor configured to detect and generate a signal indicative of at least one of a position of the throttle valve, an intake pressure in the air induction device, and an amount of the air in the air induction device, the control device being configured to determine whether a state of the engine corresponds to one of a plurality of degrees of acceleration including at least sudden acceleration and gradual acceleration based upon at least one of the throttle position signal, the intake pressure signal, and the air amount signal or another signal indicating an operational condition of the engine and sent by another sensor, the control device being configured to control the change mechanism to advance the timing based only upon at least one of the throttle opening degree signal, the intake pressure signal or the air amount signal when the control device determines the sudden acceleration state.

29. The engine as set forth in claim 28, wherein the control device is configured to determine the sudden acceleration state when one of a change rate of the throttle position signal, a change rate of the intake pressure signal and a change rate of the air amount signal or a change rate of the another signal becomes greater than a predetermined magnitude.

30. The engine as set forth in claim 29 additionally comprising an output shaft coupled with the movable member for rotation with the movable member, the another sensor including a sensor sensing an angular position of the output shaft and sending an angular position signal to the control device, the control device being configured to calculate a rotational speed of the output shaft based upon the angular position signal, the calculated rotational speed comprises the another signal.

31. The engine as set forth in claim 28, wherein the valve actuator includes an intake camshaft journaled on the engine body for rotation, the intake camshaft defining a cam lobe configuration actuate the intake valve, the change mechanism being configured to change the angular position of the camshaft relative to the engine body.

32. The engine as set forth in claim 28, wherein the control device is configured to control the change mechanism without regard to engine speed in the sudden acceleration state.

33. The engine as set forth in claim 32, wherein the control device is configured to control the change mechanism to advance the timing based on engine speed during the gradual acceleration state.

34. The engine as set forth in claim 33, wherein the gradual acceleration state is an ordinary acceleration state.

* * * * *